US011823067B2

(12) United States Patent
Dhanyamraju et al.

(10) Patent No.: US 11,823,067 B2
(45) Date of Patent: Nov. 21, 2023

(54) SYSTEM AND METHOD FOR TUNING AND DEPLOYING AN ANALYTICAL MODEL OVER A TARGET ECO-SYSTEM

(71) Applicant: HCL Technologies Limited, Noida (IN)

(72) Inventors: S U M Prasad Dhanyamraju, Hyderabad (IN); Satya Sai Prakash Kanakadandi, Hyderabad (IN); Sriganesh Sultanpurkar, Hyderabad (IN); Karthik Leburi, Hyderabad (IN); Vamsi Peddireddy, Hyderabad (IN)

(73) Assignee: HCL Technologies Limited, Noida (IN)

( * ) Notice: Subject to any disclaimer, the term of this patent is extended or adjusted under 35 U.S.C. 154(b) by 1320 days.

(21) Appl. No.: 16/013,846

(22) Filed: Jun. 20, 2018

(65) Prior Publication Data

US 2018/0373988 A1 Dec. 27, 2018

(30) Foreign Application Priority Data

Jun. 27, 2017 (IN) .............................. 201711022439

(51) Int. Cl.
*G06N 5/02* (2023.01)
*G06F 17/18* (2006.01)
(Continued)

(52) U.S. Cl.
CPC ............. *G06N 5/02* (2013.01); *G06F 16/986* (2019.01); *G06F 17/18* (2013.01); *G06N 20/20* (2019.01);
(Continued)

(58) Field of Classification Search
CPC ........ G06N 5/02; G06N 20/20; G06F 16/986; G06F 17/18
See application file for complete search history.

(56) References Cited

U.S. PATENT DOCUMENTS 9,020,868 B2    4/2015  Elkins et al.
9,135,559 B1    9/2015  Chan et al.
(Continued)

FOREIGN PATENT DOCUMENTS

CN    106022483 A    10/2016
WO    2016160626 A1   10/2016
WO    2017035536 A1    3/2017

OTHER PUBLICATIONS

Smith et al., "Federated Multi-Task Learning," arXiv:1705.10467v1 [cs.LG] May 30, 2017 (Year: 2017).*
(Continued)

*Primary Examiner* — Miranda M Huang
*Assistant Examiner* — Yao David Huang

(57) ABSTRACT

The present disclosure relates to system(s) and method(s) for tuning an analytical model. The system builds a global analytical model based on modelling data received from a user. Further, the system analyses a target eco-system to identify a set of target eco-system parameters. The system further selects a sub-set of model parameters, corresponding to the set of target eco-system parameters, from a set of model parameters. Further, the system generates a local analytical model based on updating the global analytical model, based on the sub-set of model parameters and one or more PMML wrappers. The system further deploys the local analytical model at each node, from a set of nodes, associated with the target eco-system. Further, the system gathers test results from each node based on executing the local analytical model. The system further tunes the sub-set of model parameters associated with the local analytical model using federated learning algorithms.

13 Claims, 3 Drawing Sheets

(51) Int. Cl.

| | | |
|---|---|---|
| *G06F 16/958* | (2019.01) | |
| *G06N 20/20* | (2019.01) | |
| *G06N 3/126* | (2023.01) | |
| *G06N 3/04* | (2023.01) | |
| *G06N 20/10* | (2019.01) | |
| *G06N 3/044* | (2023.01) | |
| *G06N 3/045* | (2023.01) | |
| *G06N 3/047* | (2023.01) | |
| *G06N 5/01* | (2023.01) | |

(52) U.S. Cl.
CPC .............. *G06N 3/044* (2023.01); *G06N 3/045* (2023.01); *G06N 3/047* (2023.01); *G06N 3/0409* (2013.01); *G06N 3/126* (2013.01); *G06N 5/01* (2023.01); *G06N 20/10* (2019.01)

(56) References Cited

U.S. PATENT DOCUMENTS

| | | | |
|---|---|---|---|
| 9,563,670 B2 | 2/2017 | Wasson et al. | |
| 9,887,884 B2 | 2/2018 | Benchorin et al. | |
| 2012/0185424 A1* | 7/2012 | Vaidyanathan | G06N 7/005 706/52 |
| 2013/0232094 A1* | 9/2013 | Anderson | G05B 23/0281 706/12 |
| 2015/0293755 A1 | 10/2015 | Robins et al. | |
| 2016/0140359 A1* | 5/2016 | Mukherjee | G06F 21/6245 726/26 |
| 2016/0217388 A1* | 7/2016 | Okanohara | G06N 20/00 |
| 2016/0335550 A1* | 11/2016 | Achin | G06N 5/02 |
| 2017/0132817 A1* | 5/2017 | Mahajan | G06N 3/105 |
| 2017/0149937 A1* | 5/2017 | Ren | H04W 4/70 |
| 2017/0185921 A1* | 6/2017 | Zhang | G06N 20/00 |
| 2018/0032908 A1* | 2/2018 | Nagaraju | G06F 11/3409 |
| 2018/0034715 A1* | 2/2018 | Nagaraju | G06F 16/2477 |
| 2018/0109428 A1* | 4/2018 | Kattepur | H04W 4/70 |
| 2018/0144265 A1* | 5/2018 | Bonawitz | G06N 20/00 |
| 2018/0240011 A1* | 8/2018 | Tan | G06N 3/045 |
| 2018/0285759 A1* | 10/2018 | Wood | G06F 15/76 |
| 2019/0087975 A1* | 3/2019 | Versace | G06V 20/10 |

OTHER PUBLICATIONS

H. Brendan McMahan, Eider Moore, Daniel Ramage, Seth Hampson, Blaise Aguera Y Arcas. "Communication-Efficient Learning of Deep Networks from Decentralized Data" 2016.

Daniel Berg, Carl Swanson. "Update your running cloud apps with no downtime" Apr. 20, 2016.

Jakub Konecny, H. Brendan Mcmahan, Felix X. Yu, Peter Richtarik, Anada Theertha Suresh, Dave Bacon. "Federated Learning: Strategies for Improving Communication Efficiency", Oct. 30, 2017.

* cited by examiner

SYSTEM AND METHOD FOR TUNING AND DEPLOYING AN ANALYTICAL MODEL OVER A TARGET ECO-SYSTEM

CROSS-REFERENCE TO RELATED APPLICATIONS AND PRIORITY

This present application claims benefit from Indian Complete Patent Application No 201711022439 filed on 27 Jun. 2017, the entirety of which is hereby incorporated by reference.

TECHNICAL FIELD

The present disclosure in general relates to the field of data processing. More particularly, the present invention relates to a system and method for tuning and deploying an analytical model over a target eco-system.

BACKGROUND

Data analysis may be performed on different platforms by deploying an analytical model that suits and fits the eco system of respective platforms. The analytics platform may be cloud environment, mobile environment, fog environment, edge environment and embedded environment. However, it may be understood that the requirements related to the analytical model for each of these platforms is different. Some of platforms may have limited memory and processing speed while some other platform may require moderate memory and some requires distributed memory. Further, implementing analytical algorithms vis-a-vis models may be time and computation resource intensive often times. Also thus built models may have to be deployed in several production environments for real use. Exporting models and deploying them over different enterprise eco systems is an early stage. Model building, tuning, deployment, run-time monitoring and model updating in real time vary for different eco systems such as mobile, fog, edge and embedded.

Further, for an analytical model build for the edge environment, parameters of the analytical model may correspond to parameters of the edge environment. It may be understood that the analytical model deployed over the edge environment may not be compatible with the mobile environment for the obvious and non-obvious reasons such as memory and computation power, job scheduling strategies and application usage dynamics in this case, it may not be possible to deploy the analytical model over the mobile environment, because parameters of the mobile environment are different from the parameters of the edge environment.

SUMMARY

Before the present systems and methods for tuning and deploying an analytical model over a target eco-system, are described, it is to be understood that this application is not limited to the particular systems, and methodologies described, as there can be multiple possible embodiments that are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for tuning and deploying an analytical model over the target eco-system. This summary is not intended to identify essential features of the claimed subject matter nor is it intended for use in determining or limiting the scope of the claimed subject matter.

In one implementation, a method for tuning an analytical model based on a target eco-system is illustrated. The method may comprise building a global analytical model based on modelling data received from a user. In one aspect, the modelling data may comprise a set of model parameters and a set of data analysis algorithms. Further, the global analytical model may comprise one or more of PMML (Predictive Model Mark-up Language) and custom model mark-up wrappers. Further, the method may comprise analysing a target eco-system. Based on the analysis of the target eco-system, a set of target eco-system parameters, associated with the target eco-system, may be identified. The method may further comprise selecting a sub-set of model parameters, from the set of model parameters. In one aspect, the sub-set of model parameters may correspond to the set of target eco-system parameters. Further, the method may comprise updating the global analytical model based on the sub-set of model parameters and the one or more of PMML (Predictive Model Mark-up Language) and custom model mark-up wrappers. Upon updating the global analytical model, a local analytical model may be generated. The local analytical model may be compatible with the target eco-system. Further, the method may comprise deploying the local analytical model at each node, from a set of nodes, associated with the target eco-system. The method may further comprise gathering test results from each node. In one aspect, the test results may be generated based on execution of the local analytical model at each node. Further, the method may comprise tuning the sub-set of model parameters associated with the local analytical model to generate a tuned local analytical model. In one aspect, federated learning algorithm in the context of incremental, iterative and distributed learning may be used for tuning of the sub-set of eco-system parameters in real-time. In one embodiment, the tuning may be based on analysis of the test results from each node.

In another implementation, a system for tuning an analytical model based on a target eco-system is illustrated. The system comprises a memory and a processor coupled to the memory, further the processor is configured to execute programmed instructions stored in the memory. In one embodiment, the processor may execute programmed instructions stored in the memory for building a global analytical model based on modelling data received from a user. In one aspect, the modelling data may comprise a set of model parameters and a set of data analysis algorithms. Further, the global analytical model may comprise one or more PMML (Predictive Model Mark-up Language) and custom model mark-up wrappers. Further, the processor may execute programmed instruction stored in the memory for analysing a target eco-system. Based on the analysis of the target eco-system, a set of target eco-system parameters, associated with the target eco-system, may be identified. The processor may further execute programmed instruction stored in the memory for selecting a sub-set of model parameters, from the set of model parameters. In one aspect, the sub-set of model parameters may correspond to the set of target eco-system parameters. Further, the processor may execute programmed instruction stored in the memory for updating the global analytical model based on the sub-set of model parameters and the one or more of PMML (Predictive Model Mark-up Language) and custom model mark-up wrappers. Upon updating the global analytical model, a local analytical model may be generated. The local analytical model may be compatible with the target eco-system. Further, the processor may execute programmed instruction stored in the memory for deploying the local analytical model at each node, from a set of nodes, associated with the target eco-system. The processor may further execute programmed instruction stored in the memory for gathering test results from each node. In one aspect, the test results may be generated based on execution of the local analytical model at each node. Further, the processor may execute programmed instruction stored in the memory for tuning the sub-set of model parameters associated with the local analytical model to generate a tuned local analytical model. In one aspect, federated learning algorithm in the context of incremental, iterative and distributed learning may be used for tuning of the sub-set of eco-system parameters in real-time. In one embodiment, the tuning may be based on analysis of the test results from each node.

In yet another implementation, a computer program product having embodied computer program for tuning an analytical model based on a target eco-system is disclosed. The program may comprise a program code for building a global analytical model based on modelling data received from a user. In one aspect, the modelling data may comprise a set of model parameters and a set of data analysis algorithms. Further, the global analytical model may comprise one or more of PMML (Predictive Model Mark-up Language) and custom model mark-up wrappers. Further, the program may comprise a program code for analysing a target eco-system. Based on the analysis of the target eco-system, a set of target eco-system parameters, associated with the target eco-system, may be identified. The program may further comprise a program code for selecting a sub-set of model parameters, from the set of model parameters. In one aspect, the sub-set of model parameters may correspond to the set of target eco-system parameters. Further, the program may comprise a program code for updating the global analytical model based on the sub-set of model parameters and the one or more of PMML (Predictive Model Mark-up Language) and custom model mark-up wrappers. Upon updating the global analytical model, a local analytical model may be generated. The local analytical model may be compatible with the target eco-system. Further, the program may comprise a program code for deploying the local analytical model at each node, from a set of nodes, associated with the target eco-system. The program may further comprise a program code for gathering test results from each node. In one aspect, the test results may be generated based on execution of the local analytical model at each node. Further, the program may comprise a program code for tuning the sub-set of model parameters associated with the local analytical model to generate a tuned local analytical model. In one aspect, federated learning algorithm in the context of incremental, iterative and distributed learning may be used for tuning of the sub-set of eco-system parameters in real-time. In one embodiment, the tuning may be based on analysis of the test results from each node.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
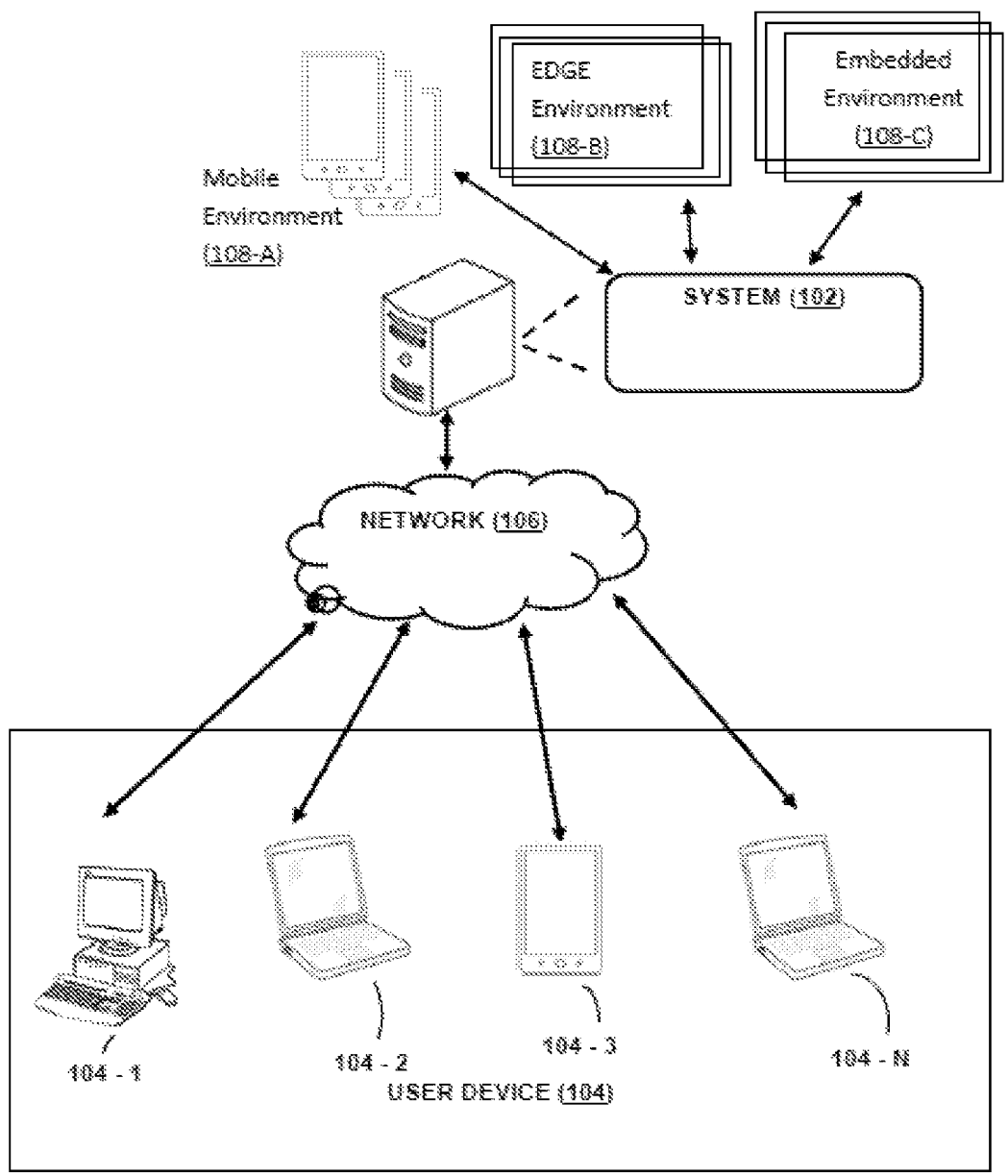
FIG. 1 illustrates a network implementation of a system for tuning and deploying an analytical model over a target eco-system, in accordance with an embodiment of the present subject matter.

Some embodiments of the present disclosure, illustrating all its features, will now be discussed in detail. The words "building", "analysing", "selecting", "updating", "deploying", "gathering" and "tuning", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for tuning and deploying an analytical model over a target eco-system are now described. The disclosed embodiments of the system and method for tuning and deploying the analytical model over the target eco-system are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for tuning and deploying an analytical model over a target eco-system is not intended to be limited to the embodiments illustrated, but is to be accorded the widest scope consistent with the principles and features described herein.

The present subject matter relates to tuning and deploying an analytical model over a target eco-system. In one embodiment, modelling data may be received from a user device based on inputs provided by a user. In one aspect, the modelling data may comprise a set of model parameters and a set of algorithms. Further, a global analytical model may be build based on analysis of the modelling data. In one embodiment, the global analytical model may comprise one or more of PMML (Predictive Model Mark-up Language) and custom model mark-up wrappers. Further, information associated with a target eco-system may be received from a user. Furthermore, a set of target eco-system parameters may be identified based on analysis of the information associated with the target eco-system. Once the set of target eco-system parameters are identified, a sub-set of model parameters, from the set of model parameters, may be selected. In one aspect, the sub-set of model parameters may correspond to the set of target eco-system parameters. Once the sub-set of model parameters is selected, the global analytical model may be updated based on the sub-set of model parameters and the one or more of PMML (Predictive Model Mark-up Language) and custom model mark-up wrappers to generate a local analytical model. Further, the local analytical model may be deployed at each node, from a set of nodes associated with the target eco-system. Upon deploying the local analytical model, the local analytical model may be executed at each node. Further, test results may be generated based on execution of the local analytical model at each node. Furthermore, the test results may be gathered and analysed. Upon analysis of the test results, the sub-set of model parameters may be tuned using Federated learning algorithm. In one aspect, the one or more of PMML (Predictive Model Mark-up Language) and custom model mark-up wrappers may be used for tuning the sub-set of model parameters. Further, the network implementation of system for tuning and deploying an analytical model over a target eco-system is illustrated with FIG. 1.

Referring now to FIG. 1, a network implementation 100 of a system 102 for tuning and deploying an analytical model over a target eco-system is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a server. Further, the system 102 may be implemented in a cloud network. The system 102 may further be configured to communicate with a mobile environment 108-A, an edge environment 108-B, and an embedded environment 108-C. Further, the mobile environment 108-A may correspond to one or more mobile devices, laptop computer, desktop computer and the like. The edge environment 108-B may correspond to one or more switches, gateways, high flux and the like. The embedded environment 108-C may correspond to printers, chip-sets, batch or hybrid modes and the like.

Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to receive modelling data from the user device 104 based on inputs provided by a user. The modelling data may comprise a set of model parameters and a set of algorithms. Once the modelling data is received, the system 102 may be configured to build a global analytical model based on the user inputs and the modelling data. In one embodiment, the global analytical model may be built using a model engine, installed over the system 102.

Further, the system 102 may be configured to receive information associated with the target eco-system from the user device 104 based on user inputs. The system 102 may further analyse the information associated with the target eco-system. Based on analysing the information associated with the target eco-system, the system 102 may identify a set target eco-system parameters, associated with a target eco-system. In one embodiment, the target eco-system may be one of an edge environment, a mobile environment, and an embedded environment. Further, the set of target eco-system parameters may correspond to number of nodes, network, connectivity, memory size, footprint size, input and output format, other topologies and the like. Further, the system 102 may be configured to analyse the set of target eco-system parameters. Based on the analysis of the set of target eco-system parameters, the system 102 may be configured to select a sub-set of model parameters, from the set of model parameters. In one aspect, the sub-set of model parameters may correspond to the set of target eco-system parameters.

Upon selecting the sub-set of model parameters, the system 102 may be configured to update the global analytical model based on the sub-set of analytical model. In one aspect, one or more of PMML (Predictive Model Mark-up Language) and custom model mark-up wrapper, associated with the global analytical model, may be used to update the global analytical model according to the sub-set of model parameters. Further, the system 102 may be configured to generate a local analytical model based on the updating of the global analytical model. In one embodiment, the system 102 may perform data synchronization between the global analytical model and local analytical model.

Further to the generation of local analytical model, the system 102 may be configured to deploy the local analytical model at each node, from a set of nodes, associated with the target eco-system. In one embodiment, the set of nodes, may correspond to edge devices with edge environment, mobile devices with mobile environment, embedded devices with embedded environment and the like.

Once the local analytical model is deployed, the system 102 may be configured to gather test results based on execution of the local analytical model at each node. Further, the system 102 may analyse the test results. Upon analysis of the test results, the system 102 may be configured to tune the sub-set of model parameters, associated with the local analytical model. In one embodiment, Federated Learning algorithm in the context of incremental, iterative and distributed learning may be used for tuning of the sub-set of analytical model. In one aspect, the one or more of PMML (Predictive Model Mark-up Language) and custom mark-up wrappers may be used for tuning of the sub-set of model parameters, associated with the local analytical model, to generate a tuned analytical model. In one aspect, the system 102 may perform data synchronization between the local analytical model and tuned analytical model. Further, the system for tuning and deploying an analytical model over a target eco-system is elaborated with respect to FIG. 2.

Figure 2:
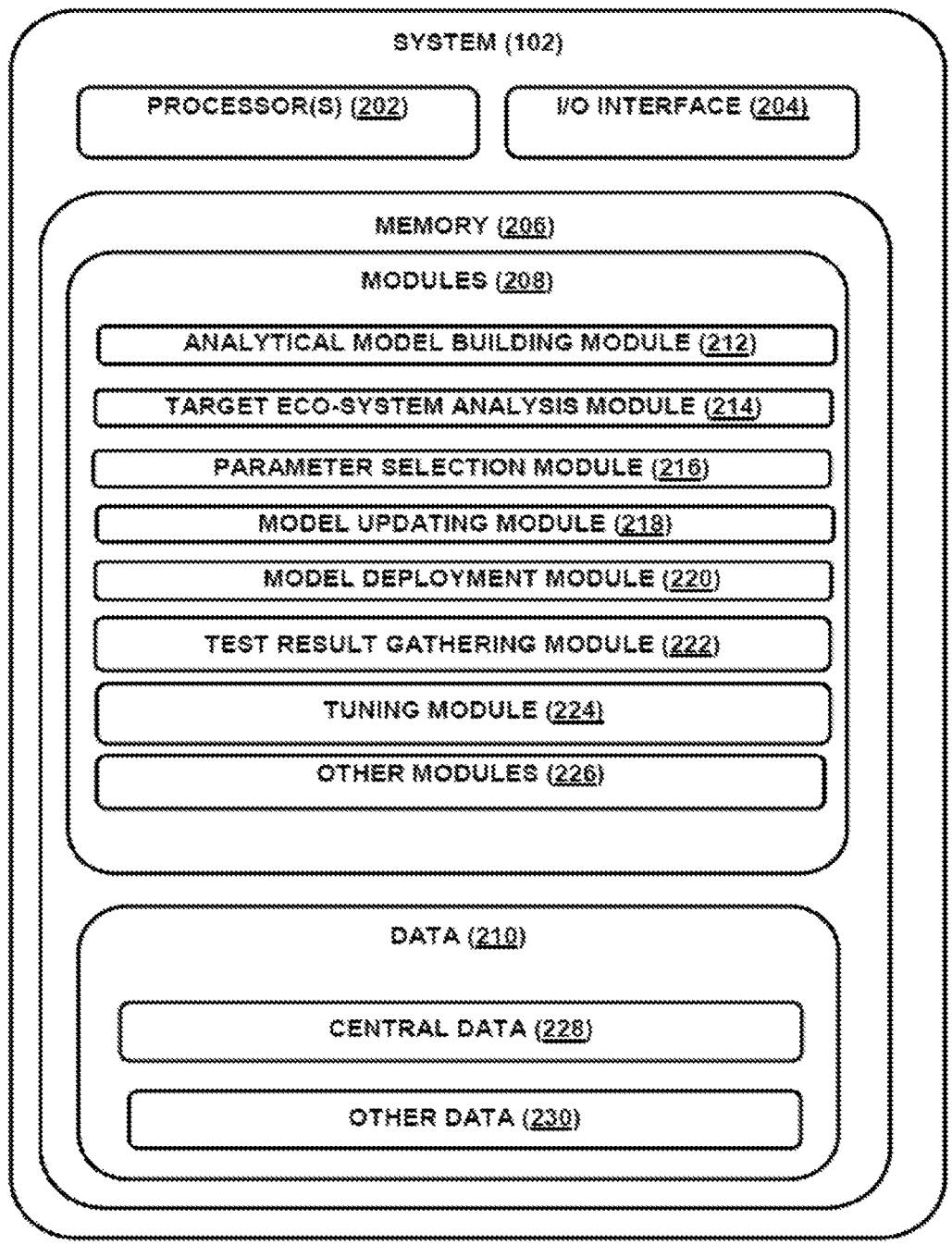
FIG. 2 illustrates the system for tuning and deploying an analytical model over a target eco-system, in accordance with an embodiment of the present subject matter.

Referring now to FIG. 2, the system 102 for tuning and deploying an analytical model over a target eco-system is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include an analytical model building module 212, a target eco-system analysis module 214, a parameter selection module 216, a model updating module 218, a model deployment module 220, a test results gathering module 222, a tuning module 224 and other modules 226. The other modules 226 may include programs or coded instructions that supplement applications and functions of the system 102.

The data 210, amongst other things, serve as a repository for storing data processed, received, and generated by one or more of the modules 208. The data 210 may also include a central data 228, and other data 230. In one embodiment, the other data 230 may include data generated as a result of the execution of one or more modules in the other modules 226.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

Analytical Model Building Module 212

In one embodiment, the analytical model building module 212 may be configured to receive modelling data from the user device 104 based on user inputs. In one example, the modelling data may be received from external data sources. The modelling data may comprise a set of model parameters, a set of algorithms and the like. In one embodiment, the set of algorithm may comprise kMeans algorithm, decision tree algorithm, Random Forest (RF), Genetic Algorithms (GA), Simulated Annealing (SA), Convolutional Neural Networks (CNN), Recurrent Neural Networks (RNN), Auto Regression Integrated Moving Average (ARIMA), Cox PH Survival Model (CPH), Accelerated Failure Time Model (AFT), Support Vector Machine (SVM), Linear Programming, Quadratic programming, Hierarchical clustering, kNN classifier, Boltzmann Machines, Restricted Boltzmann Machine (RBM), Adaptive Resonance Theory (ART) and the like. In one aspect, the set of model parameters may correspond to memory size of a model, footprint size that a model is able to analyse, limits of quantitation (LOQ), level of accuracy, level of precision, run time and the like. In one example, the modelling data may also comprise platforms such as Apache Spark, Scala, Theano, Keras, Augustus and the like.

Once the modelling data is received, the analytical model building module 212 may be configured to build a global analytical model. In one aspect, the analytical model building module 212 may analyse the modelling data to generate the global analytical model. In one example, the global analytical model may be referred as a shared analytical model. In one aspect, the global analytical model may comprise one or more of PMML (Predictive Model Mark-up Language) and custom model mark-up wrappers. In one embodiment, the one or more of PMML (Predictive Model Mark-up Language) and custom model mark-up wrapper may be used further for tuning of the global analytical model. Further, the global analytical model may be used to perform analysis of numerical data, text, images, video data, audio data and the like.

Target Eco-System Analysis Module 214

Further, the target eco-system analysis module 214 may be configured to receive information associated with a target eco-system. In one example, the information associated with the target eco-system may be received from the user device 104 based on user inputs. In one aspect, the information associated with the target eco-system may comprise name of the target eco-system, parameters of the target eco-system, and the like. The name of the target eco-system may correspond to an edge environment, an embedded environment, a mobile environment, a fog environment and a cloud environment.

In one embodiment, the edge environment may correspond to devices such as switched, gateways, high flux, speedy execution devices and the like. In one example, the embedded environment may correspond to devices such as printers, chip-sets, and the like. In one example, the mobile environment may correspond to mobile devices such as smart phones, laptop computer, desktop computer and the like.

Further, the target eco-system analysis module 214 may be configured to analyse the information associated with the target eco-system. Based on the analysis of the information associated with the target eco-system, the target eco-system analysis module 214 may be configured to identify a set of target eco-system parameters. In one embodiment, the set of target eco-system parameter may comprise number of nodes, network connectivity, footprint size, memory size, input and output formats, other topologies and the like. In one embodiment, the set of target eco-system parameters, associated with the mobile environment, may correspond to low memory size, low CPU, personal use device, real-time usage and the like. The set of target eco-system parameters, associated with the edge environment, may correspond to moderate memory size, powerful CPU, large data flow, less latency and the like. The set of target eco-system parameters, associated with the embedded environment, may correspond to moderate memory, moderate CPU, shared resources, support usage and the like. The set of target eco-system parameters, associated with the cloud environment, may correspond to distributed memory, distributed CPU, stream/batch, mode latency and the like. In one example, the target eco-system analysis parameters 214 may use machine learning and deep learning algorithms to analyse the information associated with the target eco-system.

Parameter Selection Module 216

Once the set of target eco-system parameters is identified, the parameter selection module 216 may be configured to select a sub-set of model parameters, from the set of model parameters associated with the global analytical model. In one embodiment, the sub-set of eco-system parameters may be selected based on analysing the set of target eco-system parameters. In one example, the sub-set of model parameters may be corresponding to the set of target eco-system parameters. In one embodiment, the sub-set of model parameters may comprise one or more parameters that are necessary for deployment of the global analytical model over the target eco-system. In one example, the parameter selection module 216 may check the set of target eco-system parameters and then select the sub-set of model parameters, from the set of model parameters.

In one exemplary embodiment, the set of model parameters may be a set of hundred model parameters associated with the global analytical model. Further, the target eco-system analysis module 214 may identify ten target eco-system parameters, that are necessary for deployment of the global analytical model over the target eco-system. In this case, the parameter selection module 216 may select ten model parameters, from the set of hundred model parameters. The sub-set of ten model parameters may correspond to the set of ten target eco-system parameters.

Model Updating Module 218

Upon selecting the sub-set of model parameters, the model updating module 218 may be configured to update the global analytical model. In one aspect, the global analytical model may be updated based on the sub-set of model parameters using the one or more of PMML (Predictive Model Mark-up Language) and custom model mark-up wrappers. In one embodiment, the model updating module 218 may update the sub-set of model parameters as per the set of target eco-system parameters. In another embodiment, the model updating module 218 may use the one or more of PMML (Predictive Model Mark-up Language) and custom model mark-up wrappers to update the sub-set of model parameters as per the set of target eco-system parameters.

Once the global analytical model is updated, the model updating module 218 may be configured to generate a local analytical model, based on the updating of the global analytical model. In one embodiment, the sub-set of model parameters may be associated with the local analytical model. In one aspect, the values corresponding to sub-set of model parameters may be changed as per the values corresponding to the set of target eco-system parameters. Thus, it may be understood that the local analytical model may be compatible with the target eco-system.

In one exemplary embodiment, considering the mobile environment as the target eco-system, the parameter selection module 216 may select the sub-set of model parameters based on analysing the set of target eco-system parameters associated with the mobile environment. In one example, the set of target eco-system parameters, associated with the mobile environment, may comprise small memory size, small footprint size, personal and real-time use, and the like. In this case, the sub-set of model parameters may be selected as per the set of target eco-system parameters, associated with the mobile environment. Further, the model updating module 218 may update the global analytical model according to the sub-set of model parameters. Based on the updating of the global analytical model, the local analytical model that is compatible with the mobile environment may be generated.

Model Deployment Module 220

Once the local analytical model is generated, the model deployment module 220 may be configured to deploy the local analytical model at each node, from a set of nodes, associated with target eco-system. In one example, each node may indicate one or more devices with target eco-system. In one example, each node of the edge environment may correspond to one or more edge devices. Each node of the mobile environment may correspond to one or more mobile devices. Each node of the embedded environment may correspond to one or more embedded devices.

In one aspect, the local analytical model may be deployed and re-deployed with zero-down time. Further, the model deployment module 220 may be configured to perform data synchronization between the local analytical model and the global analytical model. In one example, an ad-hoc synchronization may be performed between the local analytical model and the global analytical model.

Test Results Gathering Module 222

Once the local analytical model is deployed to the target eco-system, the test results gathering module 222 may be configured to gather test results associated with the local analytical model at each node based on execution of the local analytical model at each node. In one example, the test results may indicate results obtained based on analysis performed by the local analytical model at each node. In one embodiment, the test results may be stored at the central data 228.

In one example, considering number of nodes in the target eco-system as four (4), the local analytical model is deployed at each of the four nodes. In this case, the test results gathering module 222 may be configured to gather test results based on the execution of the local analytical model at each node, from the four nodes.

In one embodiment, the test results gathering module 222 may analyse the test results, associated with the local analytical model at each node. In one example, the test results gathering module 222 may compare the test results, associated with the local analytical model at each node. Based on the analysis of the test results, the test results gathering module 222 may determine if the local analytical model is working properly or not. In one example, the test results gathering module 222 may be configured to analyse the test results using machine learning and deep learning.

Tuning Module 224

Upon analysing the test results, the tuning module 224 may be configured to tune the sub-set of model parameters, associated with the local analytical model. In one example, the tuning of the sub-set of model parameters may be performed in real-time. In one embodiment, the tuning module 224 may tune the sub-set of model parameters using the one or more of PMML (Predictive Model Mark-up Language) and custom model mark-up wrapper. In one example, the one or more of PMML (Predictive Model Mark-up Language) and custom model mark-up wrapper may be used to fine tune the sub-set of model parameters, associated with the local analytical model, according to the set of target eco-system parameters. Once the sub-set of model parameters are tuned, the tuning module 224 may be configured to generate a tuned analytical model 224. In one example, the tuned analytical model may be re-deployed at each node of the target eco-system. The tuning module 224 may be configured to use machine learning and deep learning algorithms for re-deployment of the tuned analytical model at each node, from the set of nodes.

In one embodiment, the tuning of the sub-set of model parameters may be performed using federated learning algorithm. In one example, the federated learning algorithm in context of incremental, iterative and distributed learning may be enabled for all the machine learning and deep learning algorithms In one aspect, the tuning module 224 may be configured to continuously analyse the target eco-system using the federated learning algorithm. Further, the federated learning algorithm may enable zero down-time deployment and re-deployment of the local analytical model. In one example, an alert may be send to the user in case of failure of the data synchronization, failure of deployment of the local analytical model and the like.

In one embodiment, according to the federated learning algorithm, information associated with the tuning of each local analytical model may not be send to cloud. Thus, the information associate with the tuning of each local analytical model may be stored at the local analytical model. In one aspect, the test results gathering module 222 may gather the test results and then compare the test results associated with each of the local analytical model. However, the test results associated with one or more of the local analytical model, may be different. In this case, based on the comparison of the test results, the tuning module 224 may tune the local analytical model. Once the local analytical model is tuned, the tuning module 224 may be configured to generate the tuned analytical model. The tuning module 224 may re-deploy the tuned analytical model.

In one exemplary embodiment, construe a weather forecast model as the global analytical model and mobile environment as a target eco-system. In this case, the target eco-system analysis module 214 may identify set of target eco-system parameters, associated with the mobile environment. Further, the parameter selection module 216 may be configured to select the sub-set of model parameters as per the set of target eco-system parameters of the mobile environment. In one embodiment, the set of target eco-system parameters may correspond to six mobile devices (i.e. six nodes), and other information related to the memory size, footprint size, input and output format and the like. Thus, based on the set of target eco-system parameters, the sub-set of model parameters may be selected.

Further to the selection of sub-set of model parameters, the model updating module 218 is configured to update the global analytical model based on the sub-set of model parameters. Further, the local analytical model is generated based on updating the global analytical model. Further to the generation of the local analytical model, the model deployment module 220 is configured to deploy the local analytical model at each node of the mobile environment. In this case, the local analytical model is deployed at each node, from the six (6) nodes, of the mobile environment.

Once the local analytical model is deployed, the test results gathering module 222 is configured to enable the local analytical model to perform data analysis. Thus, the test results gathering module 222 is configured to gather test results obtained based on the data analysis performed by the six local analytical model. In one example, considering analysis of weather forecast for one day, the test results associated with one of the local analytical model, from the six local analytical models, may show sunny atmosphere. Further, test results associated with remaining five local analytical models may show rainy/cloudy weather. In this case, the test results are different. Thus, the test results gathering module 222 may compare the test results. Further, based on comparing the test results, the tuning module 224 may tune the sub-set of model parameters, associated with the local analytical model. Further, the federated learning algorithm may be used for fine tuning the sub-set of model parameters associated with the one local analytical model, showing sunny atmosphere. The federated learning algorithm updates the local analytical model, with sunny atmosphere. In one aspect, the one or more of PMML (Predictive Model Mark-up Language) and custom model mark-up wrapper may be used to fine tune the sub-set of model parameters. In one embodiment, the tuned analytical model may be generated based on the fine tuning of the sub-set of model parameters. Further, the tuned analytical model may be re-deployed at the node, showing sunny atmosphere. Further, method for tuning and deploying an analytical model over a target eco-system is illustrated with respect to FIG. 3.

Figure 3:
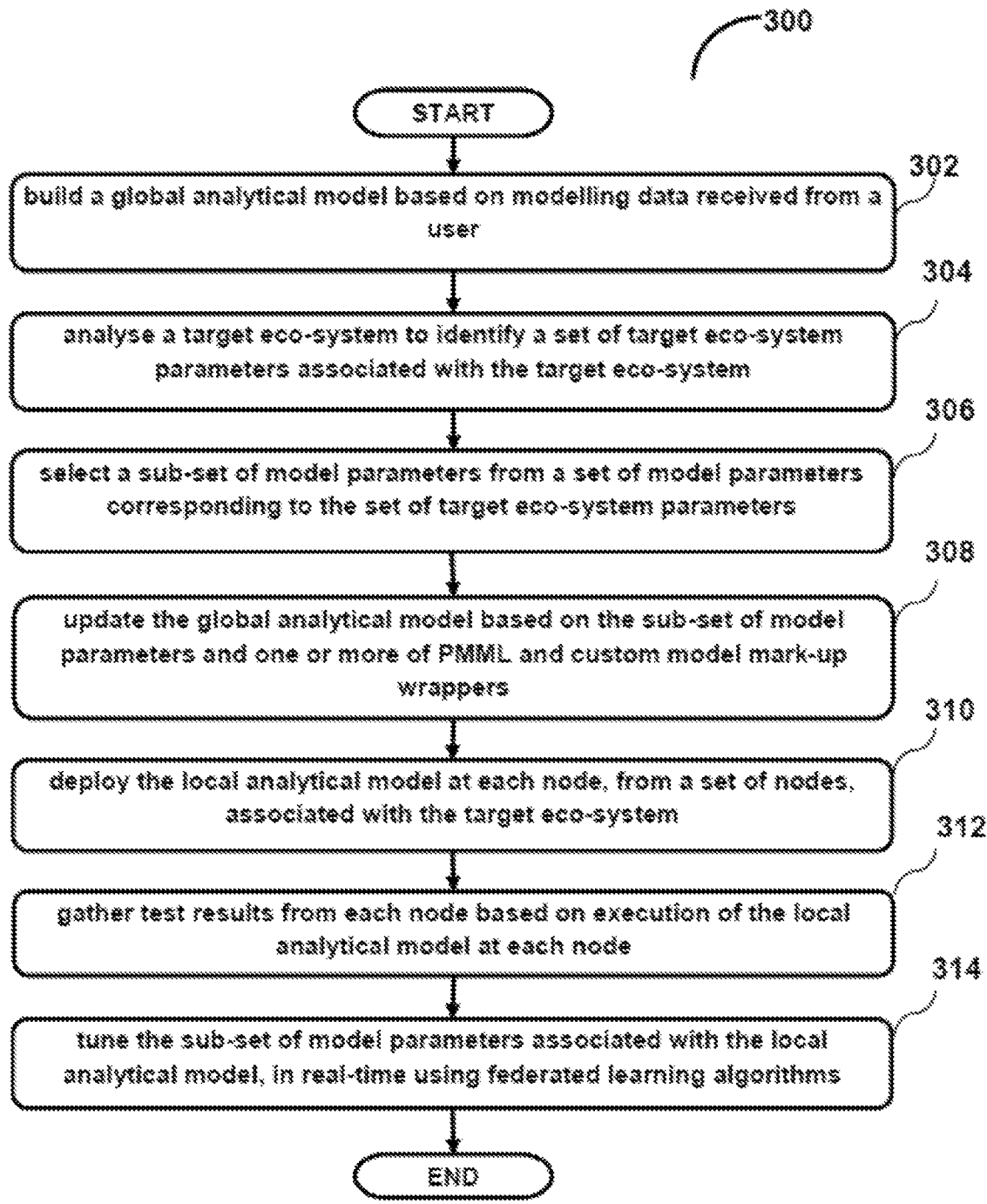
FIG. 3 illustrates a method for tuning and deploying an analytical model over a target eco-system, in accordance with an embodiment of the present subject matter.

Referring now to FIG. 3, a method 300 for tuning and deploying an analytical model over a target eco-system, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, the analytical model building module 212 may receive modelling data from the user device 104 based on user inputs. In one example, the modelling data may be received from external data sources. The modelling data may comprise a set of model parameters, a set of algorithms and the like. Once the modelling data is received, the analytical model building module 212 may be configured to build a global analytical model. In one aspect, the analytical model building module 212 may analyse the modelling data to generate the global analytical model. In one example, the global analytical model may be referred as a shared analytical model. In one aspect, the global analytical model may comprise one or more of PMML (Predictive Model Mark-up Language) and custom model mark-up wrappers. In one embodiment, the one or more of PMML (Predictive Model Mark-up Language) and custom model mark-up wrapper may be used further for tuning of the global analytical model. Further, the global analytical model may be used to perform analysis of numerical data, text, images, audio data, video data and the like.

At block 304, the target eco-system analysis module 214 may receive information associated with a target eco-system. In one example, the information associated with the target eco-system may be received from the user device 104 based on user inputs. Further, the target eco-system analysis module 214 may be configured to analyse the information associated with the target eco-system. Based on the analysis of the information associated with the target eco-system, the target eco-system analysis module 214 may be configured to identify a set of target eco-system parameters. In one embodiment, the set of target eco-system parameter may comprise number of nodes, network connectivity, footprint size, memory size, input and output formats, other topologies and the like. In one example, the target eco-system analysis parameters 214 may use machine learning and deep learning algorithms to analyse the information associated with the target eco-system.

At block 306, the parameter selection module 216 may select a sub-set of model parameters, from the set of model parameters associated with the global analytical model. In one embodiment, the sub-set of eco-system parameters may be selected based on analysing the set of target eco-system parameters. In one example, the sub-set of model parameters may be corresponding to the set of target eco-system parameters. In one embodiment, the sub-set of model parameters may comprise one or more parameters that are necessary for deployment of the global analytical model over the target eco-system. In one example, the parameter selection module 216 may check the set of target eco-system parameters and then select the sub-set of model parameters, from the set of model parameters.

At block 308, the model updating module 218 may update the global analytical model. In one aspect, the global analytical model may be updated based on the sub-set of model parameters using the one or more of PMML (Predictive Model Mark-up Language) and custom model mark-up wrappers. In one embodiment, the model updating module 218 may update the sub-set of model parameters as per the set of target eco-system parameters. In another embodiment, the model updating module 218 may use the one or more of PMML (Predictive Model Mark-up Language) and custom model mark-up wrappers to update the sub-set of model parameters as per the set of target eco-system parameters. Once the global analytical model is updated, the model updating module 218 may be configured to generate a local analytical model, based on the updating of the global analytical model. In one embodiment, the sub-set of model parameters may be associated with the local analytical model. In one aspect, the values corresponding to sub-set of model parameters may be changed as per the values corresponding to the set of target eco-system parameters. Thus, it may be understood that the local analytical model may be compatible with the target eco-system.

At block 310, the model deployment module 220 may deploy the local analytical model at each node, from a set of nodes, associated with target eco-system. In one example, each node may indicate one or more devices with target eco-system. In one aspect, the local analytical model may be deployed and re-deployed with zero-down time. Further, the model deployment module 220 may be configured to perform data synchronization between the local analytical model and the global analytical model. In one example, an ad-hoc synchronization may be performed between the local analytical model and the global analytical model.

At block 312, the test results gathering module 222 may gather test results associated with the local analytical model at each node based on execution of the local analytical model at each node. In one embodiment, the test results gathering module 222 may analyse the test results, associated with the local analytical model at each node. In one example, the test results gathering module 222 may compare the test results, associated with the local analytical model at each node. Based on the analysis of the test results, the test results gathering module 222 may determine if the local analytical model is working properly or not. In one example, the test results gathering module 222 may be configured to analyse the test results using machine learning and deep learning.

At block 314, the tuning module 224 may tune the sub-set of model parameters, associated with the local analytical model. In one example, the tuning of the sub-set of model parameters may be performed in real-time. In one embodiment, the tuning module 224 may tune the sub-set of model parameters using the one or more of PMML (Predictive Model Mark-up Language) and custom model mark-up wrapper. In one example, the one or more of PMML (Predictive Model Mark-up Language) and custom model mark-up wrapper may be used to fine tune the sub-set of model parameters, associated with the local analytical model, according to the set of target eco-system parameters. Once the sub-set of model parameters are tuned, the tuning module 224 may be configured to generate a tuned analytical model 224. In one example, the tuned analytical model may be re-deployed at each node of the target eco-system. The tuning module 224 may be configured to use machine learning and deep learning algorithms for re-deployment of the tuned analytical model at each node, from the set of nodes. In one embodiment, the tuning of the sub-set of model parameters may be performed using federated learning algorithm.

According to the federated learning algorithm, information associated with the tuning of each local analytical model may not be send to cloud. Thus, the information associate with the tuning of each local analytical model may be stored at the local analytical model. In one aspect, the test results gathering module 222 may gather the test results and then compare the test results associated with each of the local analytical model. However, the test results associated with one or more of the local analytical model, may be different. In this case, based on the comparison of the test results, the tuning module 224 may tune the local analytical model. Once the local analytical model is tuned, the tuning module 224 may be configured to generate the tuned analytical model. The tuning module 224 may re-deploy the tuned analytical model.

Although implementations for systems and methods for tuning and deploying an analytical model over a target eco-system have been described, it is to be understood that the appended claims are not necessarily limited to the specific features or methods described. Rather, the specific features and methods are disclosed as examples of implementations for tuning and deploying the analytical model over the target eco-system.

We claim:

1. A method for tuning an analytical model based on a target eco-system from a plurality of eco-systems, the method comprises steps of:
building, by a processor, a global analytical model based on modelling data received from a user, wherein modelling data comprises a set of model parameters and a set of data analysis algorithms, wherein the global analytical model comprises one or more of PMML (Predictive Model Mark-up Language) and custom model mark-up wrappers;

analysing, by the processor, the target eco-system based on target eco-system data received from the user to identify a set of target eco-system parameters associated with the target eco-system, wherein the target eco-system is distinct from each of the plurality of eco-systems;

selecting, by the processor, a sub-set of model parameters from a plurality of sub-sets of model parameters, corresponding to the set of target eco-system parameters, from the set of model parameters associated with the global analytical model, wherein the set of model parameters comprises the plurality of sub-sets of model parameters, and wherein each of the plurality of sub-sets of model parameters corresponds to one of the plurality of eco-systems;

updating, by the processor, the global analytical model based on the sub-set of model parameters and based on the one or more of PMML (Predictive Model Mark-up Language) and custom model mark-up wrappers associated with the global analytical model to generate a local analytical model corresponding to the target eco-system, wherein the local analytical model generated is compatible with the target eco-system, and wherein the local analytical model corresponding to the target eco-system is different from a local analytical model corresponding to one of the plurality of eco-systems;

deploying, by the processor, the local analytical model at each of a plurality of nodes in the target eco-system;

gathering, by the processor, test results from each of the plurality of nodes, wherein the test results are generated based on execution of each local analytical model at each of the plurality of nodes, wherein the test results from each of the plurality of nodes are compared to determine one or more differences in the test results corresponding to at least one node of the plurality of nodes; and tuning, by the processor, the sub-set of model parameters associated with the local analytical model of the at least one node in response to determining, in real-time using federated learning algorithms, to generate a tuned local analytical model, wherein the local analytical model of the at least one node is tuned based on the one or more differences in the test results.

2. The method of claim 1, wherein the set of algorithm comprises kMeans algorithm, decision tree algorithm, Random Forest (RF), Genetic Algorithms (GA), Simulated Annealing (SA), Convolutional Neural Networks (CNN), Recurrent Neural Networks (RNN), Auto Regression Integrated Moving Average (ARIMA), Cox PH Survival Model (CPH), Accelerated Failure Time Model (AFT), Support Vector Machine (SVM), Linear Programming, Quadratic programming, Hierarchical clustering, kNN classifier, Boltzmann Machines, Restricted Boltzmann Machine (RBM), and Adaptive Resonance Theory (ART).

3. The method of claim 1, wherein the target eco-system corresponds to one of an edge environment, a mobile environment, an embedded environment, a fog environment and a cloud environment.

4. The method of claim 1, wherein the set of target eco-system parameters corresponds to a number of nodes, network connectivity, footprint size, memory size, input and output formats and other topologies.

5. The method of claim 1, wherein the federated learning algorithms is enabled using machine learning and a deep learning algorithm.

6. The method of claim 1, wherein the one or more of PMML (Predictive Model Mark-up Language) and custom model mark-up wrapper are used for tuning of the sub-set of model parameters of the local analytical model.

7. A system for tuning an analytical model based on a target eco-system from a plurality of eco-systems, the system comprising:

a memory;

a processor coupled to the memory, wherein the processor is configured to execute programmed instructions stored in the memory to:

build a global analytical model based on modelling data received from a user, wherein modelling data comprises a set of model parameters and a set of data analysis algorithms, and wherein the global analytical model comprises one or more of PMML (Predictive Model Mark-up Language) and custom model mark-up wrappers;

analyse the target eco-system based on target eco-system data received from the user to identify a set of target eco-system parameters associated with the target eco-system, wherein the target eco-system is distinct from each of the plurality of eco-systems;

select a sub-set of model parameters from a plurality of sub-sets of model parameters, corresponding to the set of target eco-system parameters, from the set of model parameters associated with the global analytical model, wherein the set of model parameters comprises the plurality of sub-sets of model parameters, and wherein each of the plurality of sub-sets of model parameters corresponds to one of the plurality of eco-systems;

update the global analytical model based on the sub-set of model parameters and based on the one or more of PMML (Predictive Model Mark-up Language) and custom model mark-up wrappers associated with the global analytical model to generate a local analytical model corresponding to the target eco-system, wherein the local analytical model generated is compatible with the target eco-system, and wherein the local analytical model corresponding to the target eco-system is different from a local analytical model corresponding to one of the plurality of eco-systems;

deploy the local analytical model at each of a plurality of nodes in the target eco-system;

gather test results from each of the plurality of nodes, wherein the test results are generated based on execution of each local analytical model at each of the plurality of nodes, wherein the test results from each of the plurality of nodes are compared to determine one or more differences in the test results corresponding to at least one node of the plurality of nodes; and tune the sub-set of model parameters associated with the local analytical model of the at least one node in response to determining, in real-time using federated learning algorithms, to generate a tuned local analytical model, wherein the local analytical model of the at least one node is tuned based on the one or more differences in the test results.

8. The system of claim 7, wherein the set of algorithm comprises kMeans algorithm, decision tree algorithm, Random Forest (RF), Genetic Algorithms (GA), Simulated Annealing (SA), Convolutional Neural Networks (CNN), Recurrent Neural Networks (RNN), Auto Regression Integrated Moving Average (ARIMA), Cox PH Survival Model (CPH), Accelerated Failure Time Model (AFT), Support Vector Machine (SVM), Linear Programming, Quadratic programming, Hierarchical clustering, kNN classifier, Boltzmann Machines, Restricted Boltzmann Machine (RBM), and Adaptive Resonance Theory (ART).

9. The system of claim 7, wherein the target eco-system corresponds to one of an edge environment, a mobile environment, an embedded environment, a fog environment and a cloud environment.

10. The system of claim 7, wherein the set of target eco-system parameters corresponds to a number of nodes, network connectivity, footprint size, memory size, input and output formats and other topologies.

11. The system of claim 7, wherein the federated learning algorithms is enabled using machine learning and a deep learning algorithm.

12. The system of claim 7, wherein the one or more of PMML (Predictive Model Mark-up Language) and custom model mark-up wrapper are used for tuning of the sub-set of model parameters of the local analytical model.

13. A non-transitory computer-readable medium storing computer-executable instruction for tuning an analytical model based on a target eco-system from a plurality of eco-systems, the computer-executable instructions configured for:
 building a global analytical model based on modelling data received from a user, wherein modelling data comprises a set of model parameters and a set of data analysis algorithms, and wherein the global analytical model comprises one or more of PMML (Predictive Model Mark-up Language) and custom model mark-up wrappers;
 analyse the target eco-system based on target eco-system data received from the user to identify a set of target eco-system parameters associated with the target eco-system, wherein the target eco-system is distinct from each of the plurality of eco-systems;
 select a sub-set of model parameters from a plurality of sub-sets of model parameters, corresponding to the set of target eco-system parameters, from the set of model parameters associated with the global analytical model, wherein the set of model parameters comprises the plurality of sub-sets of model parameters, and wherein each of the plurality of sub-sets of model parameters corresponds to one of the plurality of eco-systems;
 update the global analytical model based on the sub-set of model parameters and based on the one or more of PMML (Predictive Model Mark-up Language) and custom model mark-up wrappers associated with the global analytical model to generate a local analytical model corresponding to the target eco-system, wherein the local analytical model generated is compatible with the target eco-system, and wherein the local analytical model corresponding to the target eco-system is different from a local analytical model corresponding to one of the plurality of eco-systems;
 deploy the local analytical model at each of a plurality of nodes in the target eco-system;
 gather test results from each of the plurality of nodes, wherein the test results are generated based on execution of each local analytical model at each of the plurality of nodes, wherein the test results from each of the plurality of nodes are compared to determine one or more differences in the test results corresponding to at least one node of the plurality of nodes; and
 tune the sub-set of model parameters associated with the local analytical model of the at least one node in response to determining, in real-time using federated learning algorithms, to generate a tuned local analytical model, wherein the local analytical model of the at least one node is tuned based on the one or more differences in the test results.

* * * * *